United States Patent [19]
Kambouris et al.

[11] Patent Number: 5,489,889
[45] Date of Patent: Feb. 6, 1996

[54] UNIVERSAL EARTHQUAKE SAFETY VALVE

[76] Inventors: K. H. Kambouris, 3835 Arroyo Rd., Salt Lake City, Utah 84106; Orlando Jerez, 930 Carnation Dr., Sandy, Utah 84094

[21] Appl. No.: 27,461

[22] Filed: Mar. 8, 1993

[51] Int. Cl.$^6$ .................................................. G08B 21/00
[52] U.S. Cl. ......................... 340/540; 340/628; 340/632; 340/690
[58] Field of Search ...................... 340/632, 628, 340/690, 540; 200/61.45 R; 73/40.5 R; 137/78.4

[56] References Cited

U.S. PATENT DOCUMENTS

| | | | |
|---|---|---|---|
| 4,833,461 | 5/1989 | Yeager | 340/690 |
| 4,860,780 | 8/1989 | Fisher . | |
| 4,916,437 | 4/1990 | Gazzaz | 340/632 |
| 4,974,624 | 12/1990 | Gotanda | 137/78.4 |
| 4,998,434 | 3/1991 | Asbra | 73/40.5 R |
| 5,001,466 | 3/1991 | Orlinsky et al. | 340/690 |
| 5,029,601 | 7/1991 | Reschke et al. . | |
| 5,050,629 | 9/1991 | Willoughby . | |
| 5,062,440 | 11/1991 | Korabiak . | |
| 5,074,327 | 12/1991 | Reid . | |

*Primary Examiner*—Jeffery A. Hofsass

[57] ABSTRACT

An improved system for shutting off utilities, such as gas and electricity, automatically in the case of an emergency, such as an earthquake, fire and the presence of hazardous fumes. The device includes a box containing the main control unit mounted on the gas main outside the building. The box includes a motion detector which triggers a relay which cuts the power to the gas valve causing the flow of gas to be cut off during an earthquake. An electrical signal is supplied by a smoke detector or a hazardous fumes detector to the relay to trigger the relay and the relay interrupts the power to the gas valve shutting the flow of gas to the building. The relay provides an electrical signal to a power breaker and a water valve in order to shut off electrical and water supply to the building. After the emergency passes and the utilities are checked for damages the system can be reset manually. Power to the box is provided by running a powerline to it. The box contains a battery backup power source for times when there is a power failure.

1 Claim, 2 Drawing Sheets

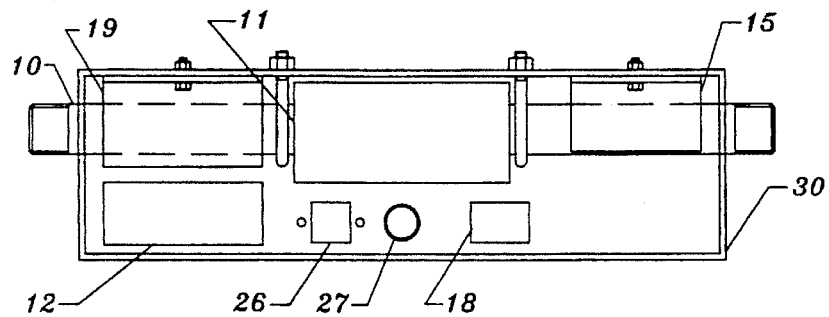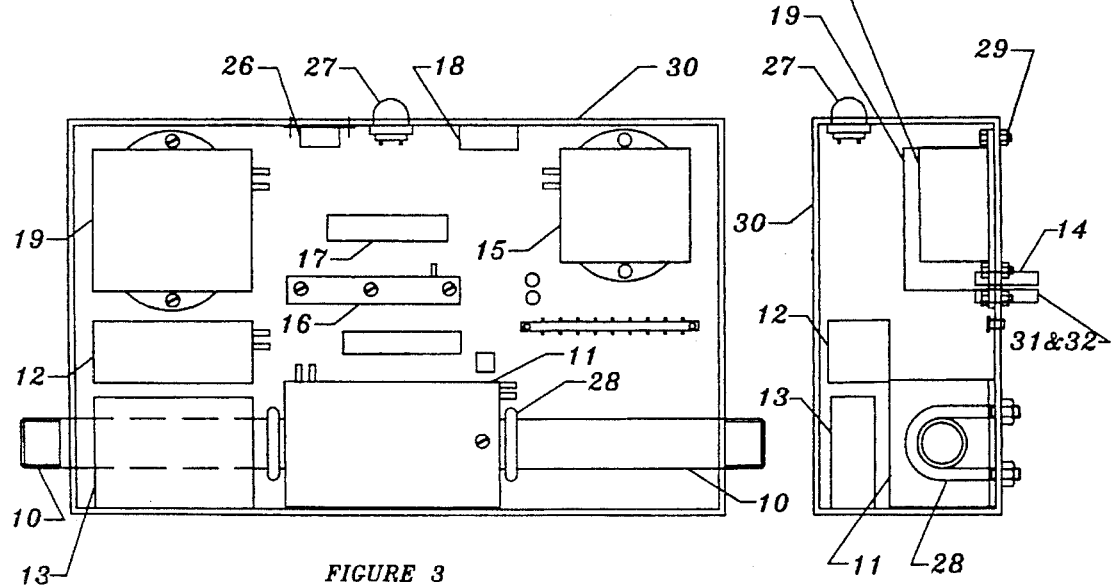

UNIVERSAL EARTHQUAKE SAFETY VALVE

BACKGROUND-FIELD OF INVENTION

This invention relates to safety valves specifically to an improved valve that is used for automatic shut off of utilities specifically gas supply during an emergency.

BACKGROUND-DESCRIPTION OF PRIOR ART

In records there are utility shut off devices that have been patented. Such devices range from mechanical devices to electronically controled, with a variation of many different types of options. Many of these devices have not been manufactured do to the cost of producing new parts to assemble the devices. Some of the mechanical units have been manufactured and have been installed in some areas of the country, ie. California, we called the gas companies to see if they new of such devices and to see how they were functioning. The report was unfavorable the devices where triggered to easy causing many problems and were hard to reset.

The following patents are on record of electronic devices to shut off utilities and detect gas leaks, and earthquakes:

U.S. Pat. No. 4,998,434 to Andrew F. Asbra (1991) discloses a Gas Leakage Detector. This device is to detect any brakeage in a gas line, but does not provide an automatic shut off to prevent gas from being deposited inside of the house in the case the line brakeage is within the house. The UESV is different as it will not provide a on line gas leak detector. The UESV uses a signal from a Hazardous Fumes Detector this electronic signal will activate the mechanism in the UESV and the gas supply to the house will be shut off until the problem is corrected and the UESV reset.

U.S. Pat. No. 5,001,466 to David E. Orlinsky and Kenneth D. Cillat (1991) discloses a Earthquake Detector. the Earthquake Detector provides warning to the residence of a building but is not equipped with any mechanism to shut off utilities to the building to prevent any disaster from occurring during an earthquake. The UESV provides a adjustable mechanism that will detect motion and when that motion is equal or grater to an earthquake of magnitude 5.0 on the richter scale the system will be set off and the utilities to the building shut off to prevent any damage to the structure and more valuable the lost of life.

U.S. Pat. No. 4,974,624 to Motohiro Gotanda (1990) discloses a Gas Shut-off Device. This device provides an automatic way to shut-off gas supply to a building but it doesn't provide any means to detect earthquakes or other emergencies. The UESV provides the mechanism to detect earthquake and uses a signal from a smoke detector and a hazardous fumes detector to activate the shut off mechanism to cut utility services to the building.

U.S. Pat. No. 4,916,437 to Hesham H. Gazzaz (1990) discloses a Gas Monitoring System with Leak Detection and Flow Cutoff. This device provides a leak detector and a shut off mechanism but it doesn't have any mechanism to detect motion in case of an earthquake. The UESV provides a way to shut off utilities to a building during an earthquake, fire, the presence of hazardous fumes, and other emergencies.

U.S. Pat. No. 4,833,461 to Richard Yeager (1989) discloses a Utility shut off Apparatus. this device provides automatic shut off to utilities during an earthquake. The description also mentions other emergencies like fire, war, etc. but fails to mention how the device shuts off the utilities incase of a fire or other emergencies. The UESV provides an automatic utility shut off mechanism during an earthquake, fire, and the presence of hazardous fumes.

OBJECTS AND ADVANTAGES

Accordingly, several objects and advantages of our invention are:

a. To provide an automatic shut off of utilities to a building during an earthquake of magnitude 5.0 or grater;

b. To provide an automatic shut off of utilities to a building during a fire using a smoke detector. The smoke detector will provide an electrical signal that will trigger the shut off mechanism of the UESV;

c. To provide an automatic shut off of utilities to a building during the detection of hazardous fumes. A hazardous fumes detector will provide an electrical signal that will trigger the shut off mechanism of the UESV;

d. To provide an automatic shut off of water supply to a building during an emergency; and e. To provide an automatic power shut off to a building during an emergency.

Further objects and advantages are to provide a valve that can be assembled using existing technology which is simple to use and inexpensive to manufacture, therefore providing the device to the consumer at a lower cost. Still further objects and advantages will become apparent from a consideration of the ensuing description and drawings.

DESCRIPTION OF DRAWINGS

FIG. 2 top view of the UESV.

FIG. 3 front view of the UESV.

FIG. 4 side view of the UESV.

LIST OF REFERENCE NUMERALS

Figure 1:
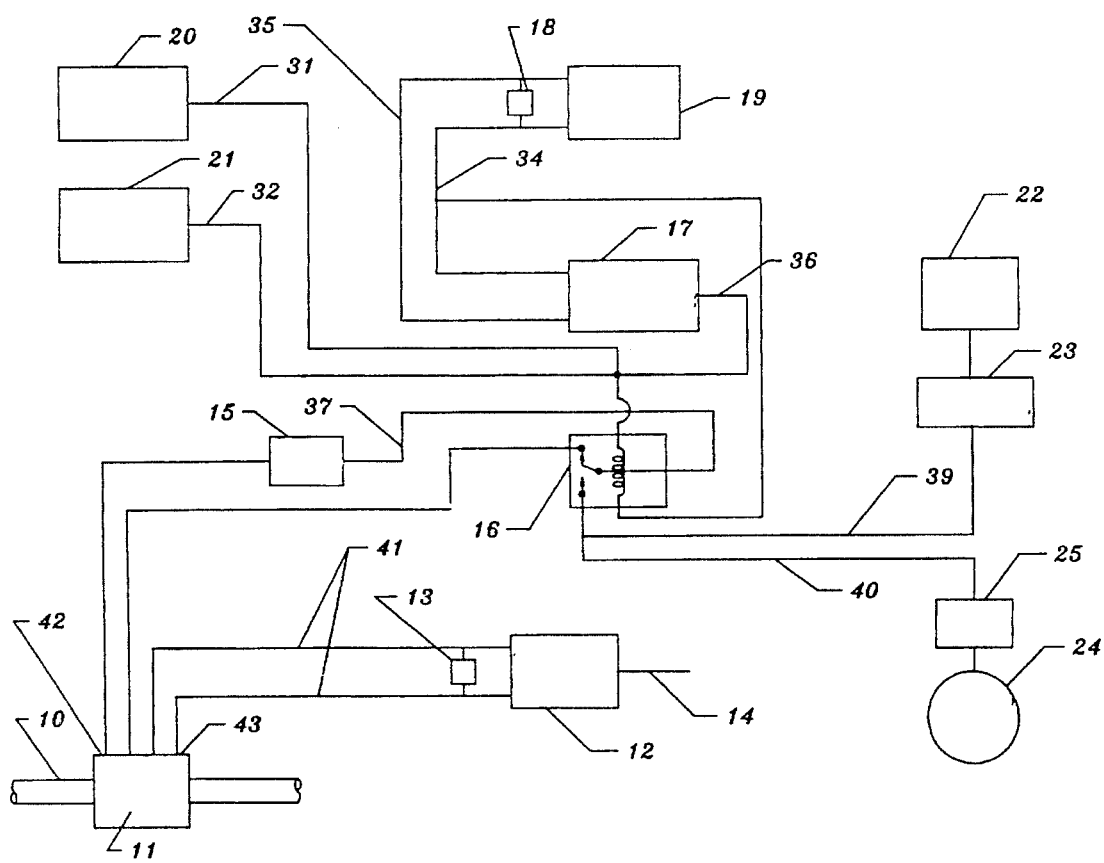
FIG. 1 is a schematic illustration of the UESV for emergency shut off of utilities as gas, electricity, and water.

10 Gas main into the building
11 Gas valve
12 24 volt power supply
13 24 volt battery backup power supply
14 Power source
15 1 volt power supply
16 Relay
17 Motion detector
18 12 volt battery backup power supply
19 12 volt power supply
20 Smoke detector
21 Hazardous fumes detector
22 Main power panel
23 Power breaker
24 Water main
25 Water valve
26 Problem indicator alarm
27 Indicator red light
28 Gas valve mounting bolts
29 Mounting rivets
30 Box

DESCRIPTION FIGS. 1 TO 4

A typical embodiment of the UESV of the present invention is illustrated in FIG. 1 and FIG. 3 (front view). The UESV has a single action two stage gas valve 11. This gas valve 11 has two valves 42 and 43. The gas valve 11 operates by using a 24 volt current from a 24 v power source 12 via connection 41 to the main valve 43 this power source keeps the main valve 43 in the gas valve 11 open. A 24 v battery backup power source 13 is provided to maintain power to the valve 43 of gas valve 11 incase of power failure. The gas valve 11 has a secondary valve 42 which is a safety valve. The valve 42 of the gas valve 11 is maintained open by a constant uninterrupted 1 volt power source 15. The valve 42 of the gas valve 11 stays open at all times as long as the power source is supplied. As soon as the power source is interrupted the safety valve 42 is activated and the gas flow is shut off.

The UESV has a 12 volt DC single pole double throw relay 16. The relay 16 is part of the circuit that maintains power to the gas valve 11, to safety valve 42 via connection 37. The relay 16 acts like a circuit breaker it receives a signal from the motion detector 12 via connection 36, or the hazardous fumes detector 21 via connection 32, or the smoke detector 20 via connection 31 said signal causes the relay 16 to open up the circuit creating an interruption of power to the safety valve 42 of the gas valve 11 and the gas valve 11 shuts off the gas supply to the building. The gas valve 11 remains shut off until it is manually reset.

The UESV has a 12 volt power supply 19 it provides power to the motion detector 17. A 12 volt battery backup power supply 18 provides power to the motion detector 17 incase of a power failure keeping the UESV in operation.

The relay 16 sends an electrical signal via 39 to a breaker 23 which shuts off the electricity to the building.

The relay 16 sends an electrical signal via connection 40 to a water valve 25 which shuts off the water supply to the building.

SUMMARY, RAMIFICATION, AND SCOPE

Accordingly, the reader will see that the UESV will provide an automatic utility shut off system during an earthquake, fire, hazardous fumes detection and other emergencies. Further more, the UESV has the additional advantage in that:

it uses components that are available on the market keeping the cost down;

it permits the production of the UESV without requiring the manufacturer to develop new components or molds;

it provides an automatic utility shut off safety valve in one package.

it is a device that is needed in every home and commercial business to provide protection to the building and its occupants in case of an emergency; and it uses components that are found in the market today and the gas valve used is the valve found in a standard furnace. It permits the consumer to reset the system without requiring especial personal.

Although the description above contains many specifities, these shouldn't be construent as limiting the scope of the invention but as merely providing illustrations of some of the presently preferred embodiments of the invention. For example an electronically reset system, a gas leakage detector and monitoring system, a light and alarm system, etc. can be added to the UESV.

Thus the scope of the invention should be determined by the appended claims and their legal equivalents, rather than by the examples given.

We claim

1. A system to shut off gas supply, the electrical power and the water supply for a building during an emergency comprising:

A power supply means to provide electrical power to the system with a battery backup power means to provide power to the system in case of a power failure and relay means;

A gas valve means to shut off the gas supply to the building;

A power breaker and a water valve;

Detector means including means to independently sense motion, smoke and hazardous fumes; and Upon the detection of motion, smoke or fumes the relay will be activated to cut off the power to the gas valve and provide an electrical signal to the power breaker and the water valve which will shut off the electric and water utilities and provide a safe condition for the building.

* * * * *